United States Patent Office 3,257,402
Patented June 21, 1966

3,257,402
5,12 - DIHYDRO - 5,7,12,14 - TETRAAZAPENTA-
CENE SULFONIC ACIDS AND SODIUM AND
POTASSIUM SALTS THEREOF
Chikatoyo Naito, Kita-ku, Kyoto-shi, Japan, assignor to
Zeria Kagaku Kabushiki Kaisha, Tokyo-to, Japan, a
company of Japan
No Drawing. Filed July 2, 1962, Ser. No. 207,003
3 Claims. (Cl. 260—267)

This invention relates to 5,12-dihydro-5,7,12,14-tetra-azapentacene sulfonic acids and their alkaline salts, their use as cataract curatives and processes for the preparation thereof.

Cataract is a senile ocular disease, making the lens turbid due to degenerated protein. In ophthamology, the rate of occurence is high, causing loss of eyesight. Its treatment has mostly been by surgical operations; there have been very few therapies worth mentioning. Cataract is generally ascribed to degenerated soluble protein in the lens, made insoluble by quinone substance resulting from metabolic abnormality of organic aminoacids, such as tryptophane, thyrosin, etc., and to the oxidation of the SH-radical of soluble protein in the lens.

In view of these facts, the inventor has synthesized various compounds to prevent the soluble protein in the lens from degeneration by quinone substance, and to activate Klause's $\beta$-protease which converts the turbid degenerated protein in the lens into soluble protein. As the result of the tests, it was discovered that 5,12-dihydro-5,7,12,14-tetraazapentacene is effective. This compound is hardly soluble in water, but by sulfonation the inventor succeeded in preparing watersoluble 5,12-dihydro-5,7,12,14-tetra-azapentacene sulfonic acids and their alkaline salts.

The 5,12-dihydro-5,7,12,14-tetraazapentacene sulfonic acids and their akaline salts are new compounds. They can be prepared by reacting 5,12-dihydro-5,7,12,14-tetra-azapentacene with fuming sulfuric acid or chlorosulfonic acid in the presence of mercury oxide or mercury sulfate as a catalyst. In this way, mono- and di-sulfonic acids of 5,12-dihydro-5,7,12,14-tetraazapentacene were produced. These compounds can be separated by alumina column chromatography, and refined.

The 5,12-dihydro-5,7,12,14-tetraazapentacene sulfonic acids and their alkaline salts are soluble in water, having high permeability into the lens sac. They activate $\beta$-protease to dissolve degenerated protein, making a turbid lens clear. They also have strong affinity for the SH-radical of soluble protein in the lens and combine with it, preventing its oxidation to cause it to become insoluble. They can be used to cure cataract by dropping into eyes or by injection.

In accordance with the invention, 5,12-dihydro-5,7,12,14-tetraazapentacene may be sulfonated under mild conditions, and then treated with saturated potassium chloride solution, to obtain potassium 5,12-dihydro-5,7,12,14-tetra-azapentacene sulfonate. The refined potassium 5,12-dihydro-5,7,12,14-tetraazapentacene sulfonate has the following analytical value.

|  | C | H | N | S |
| --- | --- | --- | --- | --- |
| Experimental value, percent | 53.5 | 2.5 | 13.6 | 8.2 |
| Theoretical value, percent | 53.7 | 2.7 | 13.9 | 7.96 |

The experimental value is approximately identical to the theoretical value, and the Anal. calcd. indicates $C_{18}H_{11}N_4O_3SK$, conforming to that of potassium 5,12-dihydro-5,7,12,14-tetraazapentacene 2 (or 9) sulfonate.

When 5,12-dihydro-5,7,12,14-tetraazapentacene is sulfonated under strong conditions, and treated with saturated potassium chloride solution, potassium 5,12-dihydro-5,7,12,14-tetraazapentacene disulfonate is obtained. Refined potassium 5,12-dihydro-5,7,12,14-tetraazapentacene disulfonate gives following analytical value:

|  | C | H | N | S |
| --- | --- | --- | --- | --- |
| Experimental value, percent | 41.8 | 2.1 | 11.1 | 11.9 |
| Theoretical value, percent | 41.5 | 1.9 | 10.8 | 12.3 |

The experimental value is nearly identical to the theoretical value; the Anal. calcd. indicates $C_{18}H_{10}N_4O_6S_2K_2$, conforming to that of potassium 5,12-dihydro-5,7,12,14-tetraazapentacene 2,9-di-sulfonate.

EXAMPLE 1

To 200 grams of cold 20% fuming sulfuric acid, a mixture of 100 grams of 5,12-dihydro-5,7,12,14-tetraazapentacene and 2 grams of mercury oxide was added gradually, and dissolved completely at 50° C. The resulting solution is heated to 130–150° C. and stirred 2 hours. There was added 75 grams of 60% fuming sulfuric acid drop by drop and the solution was stirred further for 1 hour at 135° C. When cooled, the liquid was poured into 2 liters of ice water, and then was boiled for a time. There was added hot concentrated potassium chloride solution while strongly stirred and then cooled. The separated precipitate was filtered, washed with saturated potassium chloride solution, and dried. The yield was 72 grams. The analysis is as follows:

|  | C | H | N | S |
| --- | --- | --- | --- | --- |
| Theoretical value, percent | 53.7 | 2.7 | 13.9 | 7.96 |
| Experimental value, percent | 53.5 | 2.5 | 13.6 | 8.2 |

Anal. calcd.—$C_{18}H_{11}N_4O_3SK$.

This conforms to that of potassium 5,12-dihydro-5,7,12, 14-tetraazapentacene 2 (or 9) sulfonate.

EXAMPLE 2

To 500 grams of cool 18% fuming sulfuric acid, a mixture of 100 grams of 5,12-dihydro-5,7,12,14-tetrazapentacene and 4 grams of mercury sulfate was added within 30 minutes while stirring. The mixture was gradually heated to 120° C., and stirred 1 hour at 120° C. 140 grams of 60% fuming sulfuric acid were added dropwise over a period of 3–4 hours and stirring was maintained for 1 hour at 120° C. After cooling, 100 grams of concentrated sulfuric acid and 50 grams of ethyl alcohol were added, and the liquid was left overnight. The separated precipitate was filtered with asbestos, and washed with 50 grams of concentrated sulfuric acid. The precipitate was dissolved in 2 liters of hot water, and 400 grams of hot saturated potassium chloride solution were added. When cooled, the resulting precipitate was filtered, washed with concentrated potassium chloride solution, and dried. The yield was 74 grams. The analysis is as follows:

|  | C | H | N | S |
|---|---|---|---|---|
| Theoretical value, percent | 41.5 | 1.9 | 10.8 | 12.3 |
| Experimental value, percent | 41.8 | 2.1 | 11.1 | 11.9 |

Anal. calcd.—$C_{18}H_{10}N_4O_6S_2K_2$.

The substance is potassium 5,12-dihydro-5,7,12,14-tetraazapentacene 2,9-disulfonate.

EXAMPLE 3

To 200 grams of chlorosulfonic acid were added 40 grams of 5,12-dihydro-5,7,12,14-tetraazapentacene little by little, and the mixture was heated to 95–100° C. while stirred. After cooling for 1½ hours, the liquid was poured into 1 liter of ice water to decompose unaltered chlorosulfonic acid, and precipitate, 5,12-dihydro-5,7,12,14-tetraazapentacene sulfonyl chloride. The separated precipitate was filtered, washed with water, floated on 2 liters of water and boiled. After boiling for 1½ hours, insoluble substance was filtered off. The filtrate was then concentrated, dried, and the resulting solid was washed with ethyl alcohol to remove hydrochloric acid and dried. The yield was 38 grams.

The mixture was dissolved, neutralized with N/10 caustic soda solution, concentrated and separated by alumina column chromatography, to yield 5 grams of sodium 5,12-dihydro-5,7,12,14-tetraazapentacene 2 (or 9) sulfonate, and 29 grams of sodium 5,12-dihydro-5,7,12,14-tetraazapentacene 2,9-disulfonate. Analyses are as follows:

Sodium mono-sulfonate

|  | C | H | N | S |
|---|---|---|---|---|
| Theoretical value, percent | 56.0 | 2.9 | 14.5 | 8.3 |
| Experimental value, percent | 55.6 | 2.7 | 14.2 | 8.5 |

Anal. calcd.—$C_{18}H_{11}N_4O_3SNa$.

Sodium di-sulfonate

|  | C | H | N | S |
|---|---|---|---|---|
| Theoretical value, percent | 44.3 | 2.0 | 11.5 | 13.1 |
| Experimental value, percent | 44.1 | 1.8 | 11.7 | 12.9 |

Anal. calcd.—$C_{18}H_{10}N_4O_6S_2Na_2$.

What I claim is:
1. A compound selected from the group consisting of 5,12-dihydro-5,7,12,14-tetraazapentacene-2-sulfonic acid, potassium 5,12-dihydro-5,7,12,14-tetraazapentacene-2-sulfonate, sodium 5,12-dihydro-5,7,12,14-tetraazapentacene-2-sulfonate, 5,12-dihydro-5,7,12,14-tetraazapentacene-2,9-disulfonic acid, potassium 5,12-dihydro-5,7,12,14-tetraazapentacene-2,9-disulfonate and sodium 5,12-dihydro-5,7,12,14-tetraazapentacene-2,9-disulfonate.

2. Potassium 5,12-dihydro-5,7,12,14-tetraazapentacene-2,9-disulfonate.

3. Sodium 5,12-dihydro-5,7,12,14-tetraazapentacene-2,9-disulfonate.

References Cited by the Examiner
UNITED STATES PATENTS

| 2,071,372 | 2/1937 | Wolfram et al. | 260—267 |
| 2,072,062 | 2/1937 | Wolfram et al. | 260—267 |
| 2,987,439 | 6/1961 | Wittlinger et al. | 167—59 |
| 3,150,045 | 9/1964 | Boghosian | 167—59 |

FOREIGN PATENTS

| 78,601 | 6/1893 | Germany. |

HENRY R. JILES, *Acting Primary Examiner.*

JAMES W. ADAMS, *Assistant Examiner.*